J. LONČAR.
GEAR.
APPLICATION FILED NOV. 12, 1914.
1,144,554.
Patented June 29, 1915.
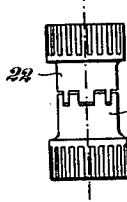
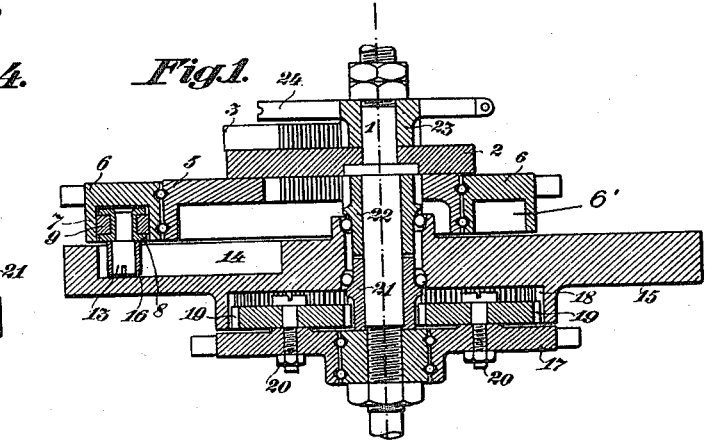
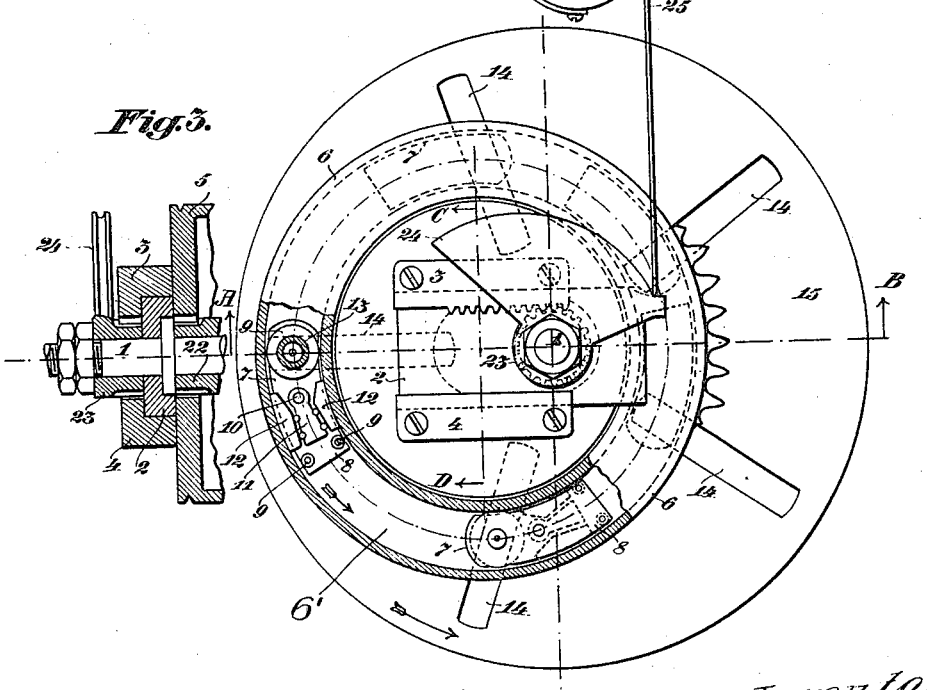
Witnesses
Lloyd R. Cornwall.
F. M. Meyer
Inventor
J. Lončar
By
[signature] Atty.

UNITED STATES PATENT OFFICE.

JOSEF LONČAR, OF VIENNA, AUSTRIA-HUNGARY.

GEAR.

1,144,554.

Specification of Letters Patent. Patented June 29, 1915.

Application filed November 12, 1914. Serial No. 871,789.

*To all whom it may concern:*

Be it known that I, JOSEF LONČAR, subject of the Emperor of Austria-Hungary, residing at 73 Triesterstrasse, Vienna, X, Austria-Hungary, have invented certain new and useful Improvements in Gears, of which the following is a specification.

This invention relates to gearing and has special reference to a variable gearing wherein the ratio of speed between the driving gear and the driven gear may vary in accordance with the ratio between power and load.

The principal object of the invention is to provide an improved and simplified general construction of devices of this character.

A second object of the invention is to provide for automatically compensating for the variation in ratio between power and load while maintaining a uniform speed of the driving gear.

With the above and other objects in view as will hereinafter be apparent the invention consists in general in certain novel features of construction and combinations of parts hereinafter fully described, illustrated in the accompanying drawings, and specifically claimed.

In the accompanying drawings like characters of reference indicate like parts in the several views, and Figure 1 is a section along the line A—B in Fig. 2. Fig. 2 is an elevation showing the gearing partly in section. Fig. 3 is a section of a part of the gearing along the line C—D in Fig. 2. Fig. 4 is an elevation of a part of the gearing.

In the disclosed embodiment of the invention, as illustrated in the drawings, there is shown a fixed axle 1 which is journaled in a guide piece 2, held between two slide bars 3 and 4 fixed on a disk 5. The latter can be displaced along the guide piece 2 in a direction at right angles to the axle 1 and serves as an inner bearing for a disk 6, to which motion can be imparted by means of a chain, a belt or any suitable means. The disk 6 has a concentrical ring shaped groove 6′ at the side opposite to the disk to be driven, said groove serving as a guide for a number of clutches 7. Each clutch consists of a casing 8, supporting a roller 9, guided in the groove of the disk 6. The casing 8 supports also a pin 10, by which it is pivotally connected with a wedge 11, against the side faces of which the jaws 12 bear. Mounted concentrically on the axle 1 is a disk 15 which is provided with radial grooves 14 receiving pins 13 carried by the clutches. To reduce the friction, each pin 13 is provided with a roller 16.

The disk 15 transmits its rotary motion to a driven disk 17 by a planetary-gearing and is provided to this end with internal teeth 18, engaging with two planet-wheels 19, supported on the disk 17 by means of stub axles 20. The central gear wheel 21 of the planetary-gearing is freely rotatable around the axle 1 and has longitudinal movement on the axle for clutch engagement with a gear wheel 22 as shown in Fig. 4. The axial displacement of the wheel 21 is necessary, to enable an adjustment of the ball-bearings of the disk 15, which are formed by the collars of the toothed wheels 21 and 22. The toothed wheel 22 engages in the gearing of the longitudinal slot of the disk 5, so that this latter is displaced perpendicularly to the axis of the gearing, when the toothed wheel rotates. At the same time the rack of the slide-bar 3 causes the turning of the toothed wheel 23, in which it engages and which carries a segment 24 with a spiral shaped circumference. At the part of this circumference, which is nearest to the axle, one end of a rope 25 is fastened. The circumference of the segment is provided with a groove, in which the rope lies, when the segment is turned to the right. The segment 24 is so constructed, that the distances between the axis and the different points of the circumference, where the rope comes in contact with the segment correspond with the ratio of gearing necessary to effect the desired result of maintaining proper relation between power and load. The other end of the rope 25 is fastened to the circumference of a rotatable disk 26, rigidly connected with a spiral cam disk 27. A rope 29, the one end of which is connected with the disk 27 at a point remote from the center, is fastened with the other end to a rod 29′, which is under the action of a spring 28 of suitable strength. By the action of the spiral cam disk 24 the moment created by the spring 28 is held constant at different tensions of the spring. The spring 28 is located in a casing 31, pivotally mounted on a pin 30. The tension of the spring is transmitted to the toothed wheel 21 by means of the rope 29, the disks 27 and 26, the rope 25, cam 24, and the toothed wheels 23 and 22.

The gear operates as follows: It is at first supposed, that the disks 6 and 15 are in concentric position. Due to the resistance of the load the disk 15 resists turning with the disk 6. By this action and in consequence of the slight friction, always existing between the jaws 12 and the inner surfaces of the groove 9', the wedge 11 advances between the jaws 12 and presses them against the said inner surfaces. The friction between the jaws and the inner surfaces becomes at last so strong, that the disk 15 is rotated in the same direction as the disk 6 by means of the clutches 7. The movement of the disk 15 together with the disk 6 is caused only by the clutches, which find the above mentioned resistance. If now the disk 6 is eccentrically displaced the clutch or clutches farthest from the axle form the driving elements for the disk 15, the remaining clutches slipping free in the groove 6'. When the load varies an automatic displacement of the disk 6 takes place in the following manner: If the moment of the load, corresponding with the ratio of gearing at any instant, surpasses the moment of the driving force, the tension of the spring 28 at that instant is not sufficient, to maintain the equilibrium against the torque exerted by the planet-wheels 19 upon the central toothed wheel 21. If the disk 6 turns in the direction of the arrows in Fig. 2, the toothed wheels 21 and 22 turn in the opposite direction and displace the disk 5, so that the degree of eccentricity and consequently the ratio of gearing is lessened. The displacement of the disk 5 causes also a rotation of the toothed wheel 23 and the segment 24 in the same direction, in which the watch-hand advances. By this movement the distance between the axis and the point, where the rope 25 touches the segment 24 increases, so that the moment of the tension of the spring balances the moment of the load. By the diminution of the ratio of gearing a new moment of the driving force, corresponding with the moment of the loading is created. By diminishing on the contrary the load, the ratio of gearing increases gradually to a maximum according to the system.

Having thus described my invention, what I claim as new, and desire to secure by Letters Patent, is—

1. In variable speed gearing, a driving gear, a driven gear, a change speed element interposed between said gears, means operable upon variation of load on the driven gear for operating the change speed element, said means including a spring and connections therefor and including eccentric cams and connections therefor arranged to control the operation of the change speed element in one direction upon reduction of the load and to permit operation thereof upon increase of the load.

2. In a variable speed gearing, a shaft, a disk rotatably concentric of said shaft and provided with a series of outwardly extending guides, a disk movable transversely of the axis of the shaft, a driving gear journaled on the last mentioned disk, clutch members slidable in said slots and engageable with said driving gear when the latter is rotated, a driven gear revolubly mounted on said shaft, planetary-gearing connecting the first disk and the driven gear and including a central gear journaled on the shaft, and means controlled by the operation of said central gear for moving the second disk transversely of the axle.

3. In a variable speed gearing, a shaft, a disk rotatably concentric of said shaft and provided with a series of outwardly extending guides, a disk movable transversely of the axis of the shaft, a driving gear journaled on the last mentioned disk, clutch members slidable in said slots and engageable with said driving gear when the latter is rotated, a driven gear revolubly mounted on said shaft, planetary-gearing connecting the first disk and the driven gear and including a central gear journaled on the shaft, means controlled by the operation of said central gear for moving the second disk transversely of the axle, and resilient means arranged to resist movement of said central gear.

In testimony whereof I affix my signature in presence of two witnesses.

JOSEF LONČAR.

Witnesses:
RUDOY KOMARCK,
WILHELM OTTO KAPPRASCH.